US012618284B2

(12) United States Patent
Wright

(10) Patent No.: US 12,618,284 B2
(45) Date of Patent: May 5, 2026

(54) DOOR SEAL

(71) Applicant: Torsion Group Corp., Strongsville, OH (US)

(72) Inventor: Kevin Wright, Greenfield, IL (US)

(73) Assignee: Torsion Group Corp., Strongsville, OH (US)

( * ) Notice: Subject to any disclaimer, the term of this patent is extended or adjusted under 35 U.S.C. 154(b) by 13 days.

(21) Appl. No.: 18/531,077

(22) Filed: Dec. 6, 2023

(65) Prior Publication Data

US 2024/0102338 A1 Mar. 28, 2024

Related U.S. Application Data

(62) Division of application No. 17/960,989, filed on Oct. 6, 2022, now Pat. No. 12,352,103.

(60) Provisional application No. 63/253,325, filed on Oct. 7, 2021.

(51) Int. Cl.

| | |
|---|---|
| ***E06B 3/88*** | (2006.01) |
| ***E06B 7/23*** | (2006.01) |
| ***F25D 23/08*** | (2006.01) |

(52) U.S. Cl.

CPC .......... *E06B 7/2307* (2013.01); *E06B 7/2314* (2013.01); *E06B 7/2316* (2013.01)

(58) Field of Classification Search

CPC .... E06B 7/2307; E06B 7/2316; E06B 7/2309; E06B 7/2314; E06B 3/88; F25D 23/082

USPC ................ 49/489.1, 496.1, 125; 53/429, 430

See application file for complete search history.

(56) References Cited

U.S. PATENT DOCUMENTS

| | | | |
|---|---|---|---|
| 1,991,776 A | 2/1935 | Gail | |
| 2,070,725 A | 2/1937 | Gail | |
| 3,518,810 A * | 7/1970 | Steeves | B65B 63/04 53/430 |

(Continued)

FOREIGN PATENT DOCUMENTS

| | | |
|---|---|---|
| DE | 2929837 B1 | 1/1981 |
| DE | 102020126026 A1 | 4/2022 |

(Continued)

OTHER PUBLICATIONS

Xcluder X2 Rodent Proof Overhead Sectional Door Seal Kit, date first available Mar. 2, 2022 [online], Available from the internet URL : https://a.co/d/e6ymkv7 (Year: 2022).

(Continued)

*Primary Examiner* — Stephen F. Gerrity
*Assistant Examiner* — Patrick B Fry
(74) *Attorney, Agent, or Firm* — Calfee, Halter & Griswold LLP

(57) ABSTRACT

A door seal for attaching to a door includes an elongated body that has a first arm for attaching to the door and a second arm pivotably coupled to the first arm. The first arm has a first connection feature, and the second arm has a second connection feature that is configured to connect to the first connection feature of the first arm. The first arm is movable relative to the second arm to a folded configuration that allows the door seal to be rolled to a coiled configuration. The second arm is movable relative to the first arm to allow the second connection feature to connect to the first connection feature such that the door seal is in an installed configuration.

18 Claims, 10 Drawing Sheets

(56) References Cited

U.S. PATENT DOCUMENTS

| | | | | |
|---|---|---|---|---|
| 3,685,206 | A * | 8/1972 | Kessler | B29C 48/22 156/279 |
| 3,871,133 | A | 3/1975 | Ellingson, Jr. | |
| D260,557 | S | 9/1981 | Bowman | |
| D260,684 | S | 9/1981 | Bowman | |
| D261,045 | S | 9/1981 | Bowman | |
| D261,046 | S | 9/1981 | Bowman | |
| D261,555 | S | 10/1981 | Bowman | |
| D265,687 | S | 8/1982 | Bowman | |
| D269,911 | S | 7/1983 | Lucous | |
| D271,905 | S | 12/1983 | Golden | |
| 4,571,889 | A | 2/1986 | Labelle | |
| D297,264 | S | 8/1988 | Dickerson | |
| D304,766 | S | 11/1989 | Weaver et al. | |
| D352,362 | S | 11/1994 | Anderson | |
| 5,396,735 | A | 3/1995 | Dietrich | |
| D377,899 | S | 2/1997 | Riley et al. | |
| 5,970,671 | A | 10/1999 | Bifano et al. | |
| D435,120 | S | 12/2000 | Bevan et al. | |
| 6,293,064 | B1 | 9/2001 | Larson | |
| D462,787 | S | 9/2002 | Scalzott | |
| D463,581 | S | 9/2002 | Mann | |
| 6,484,447 | B1 | 11/2002 | Snyder et al. | |
| D502,991 | S | 3/2005 | Rodolfo et al. | |
| D553,764 | S | 10/2007 | Vibiano | |
| D573,723 | S | 7/2008 | Vibiano | |
| D574,513 | S | 8/2008 | Vibiano | |
| D577,445 | S | 9/2008 | Durrant | |
| D624,212 | S | 9/2010 | Sawyer | |
| D625,435 | S | 10/2010 | Corey et al. | |
| D625,436 | S | 10/2010 | Corey et al. | |
| D669,601 | S | 10/2012 | Schoonover et al. | |
| D679,419 | S | 4/2013 | Gori et al. | |
| D711,554 | S | 8/2014 | Singh | |
| D713,949 | S | 9/2014 | Moore | |
| D734,503 | S | 7/2015 | Massingham | |
| D741,231 | S | 10/2015 | Schoonover | |
| D741,232 | S | 10/2015 | Schoonover | |
| D745,189 | S | 12/2015 | Stoesser et al. | |
| D745,707 | S | 12/2015 | Ellingson et al. | |
| D747,667 | S | 1/2016 | Schoonover | |
| D754,886 | S | 4/2016 | Koenig, Jr. et al. | |
| D760,135 | S | 6/2016 | Schoonover | |
| D769,460 | S | 10/2016 | Mumford, Sr. | |
| D780,942 | S | 3/2017 | Krause | |
| D786,450 | S | 5/2017 | Schoonover | |
| D788,321 | S | 5/2017 | Boer | |
| D792,609 | S | 7/2017 | Smith et al. | |
| D805,215 | S | 12/2017 | Fowler | |
| D814,057 | S | 3/2018 | Singh | |
| D822,228 | S | 7/2018 | Wang et al. | |
| D829,927 | S | 10/2018 | McClure | |
| D844,842 | S | 4/2019 | Wright | |
| D855,830 | S | 8/2019 | Greene | |
| D857,237 | S | 8/2019 | Bryant | |
| D861,196 | S | 9/2019 | Apanovich et al. | |
| D887,586 | S | 6/2020 | Baltz, Jr. et al. | |
| D889,247 | S | 7/2020 | Baltz, Jr. et al. | |
| D890,954 | S | 7/2020 | Greene | |
| D892,353 | S | 8/2020 | Greene | |
| D893,051 | S | 8/2020 | Baltz, Jr. et al. | |
| 10,731,335 | B2 | 8/2020 | Baltz, Jr. et al. | |
| D896,993 | S | 9/2020 | Baltz, Jr. et al. | |
| D901,719 | S | 11/2020 | Greene | |
| D902,443 | S | 11/2020 | Baltz, Jr. | |
| D904,649 | S | 12/2020 | Maldonado et al. | |
| D907,749 | S | 1/2021 | Wang | |
| 11,098,525 | B2 * | 8/2021 | Willert | F25D 23/087 |
| D936,459 | S | 11/2021 | Gosling | |
| 11,391,086 | B2 | 7/2022 | Webb et al. | |
| D979,100 | S | 2/2023 | Beck | |
| D981,598 | S | 3/2023 | Zhang | |
| D982,186 | S | 3/2023 | Zeng | |
| D984,675 | S | 4/2023 | Duan | |
| D987,122 | S | 5/2023 | Duan | |
| D987,123 | S | 5/2023 | Duan | |
| D988,543 | S | 6/2023 | Duan | |
| D989,358 | S | 6/2023 | Huang | |
| D994,906 | S | 8/2023 | Pare et al. | |
| D1,003,630 | S | 11/2023 | Gallien | |
| D1,030,469 | S | 6/2024 | Li | |
| D1,039,177 | S | 8/2024 | Niems | |
| D1,041,687 | S | 9/2024 | McGrue | |
| 2005/0086868 | A1 | 4/2005 | Santelli | |
| 2005/0166529 | A1 | 8/2005 | Rodolofo et al. | |
| 2008/0115460 | A1 * | 5/2008 | Ruid | B65D 85/07 53/469 |
| 2009/0246498 | A1 | 10/2009 | Deiss | |
| 2012/0079771 | A1 | 4/2012 | Meulemans | |
| 2018/0002976 | A1 | 1/2018 | Dintheer et al. | |
| 2018/0163459 | A1 * | 6/2018 | Mathieu | F25D 23/082 |
| 2018/0363362 | A1 | 12/2018 | Dintheer | |
| 2021/0140226 | A1 | 5/2021 | Kendall | |
| 2022/0081964 | A1 | 3/2022 | Stoesser et al. | |
| 2023/0116258 | A1 | 4/2023 | Wright | |

FOREIGN PATENT DOCUMENTS

| | | | |
|---|---|---|---|
| FR | 2682154 | A1 | 4/1993 |
| WO | 9741327 | A1 | 11/1997 |

OTHER PUBLICATIONS

Black Rubber Weather Stripping Door Seal Strip, date first available Mar. 13, 2023 [online], Available from the internet URL: https://www.amazon.com/Weather-Stripping-Self-Adhesive-Weatherstripping-Soundproofing/dp/BOBYSHTJL1?th= 1 (Year: 2023).

HISANDUK trimless recessed LED Aluminum Channel, date first available Sep. 20, 2023 [online], Available from the internet URL: https://www.amazon.com/HISANDUK-Plaster-trimless-recessed-Aluminum/dp/B0CJFDHSMV (Year: 2023).

Non-Final Office action for U.S. Appl. No. 17/960,989 dated Mar. 21, 2025, 5 pages.

Notice of Allowance for U.S. Appl. No. 17/960,989 dated Apr. 10, 2025, 5 pages.

* cited by examiner

DOOR SEAL

RELATED APPLICATIONS

This application claims the benefit of U.S. Non-Provisional application Ser. No. 17/960,989, filed Oct. 6, 2022, which claims the benefit of U.S. Provisional Application Ser. No. 63/253,325, riled Oct. 7, 2021, both of which are incorporated by reference in their entireties and for all purposes.

TECHNICAL FIELD

The present invention relates generally to a door seal and, more specifically, a door seal for attaching to a door, such as a garage door.

BACKGROUND

Door seals are typically attached to a door (e.g., a garage door) to seal an interior area from the space on the other side of the door, such as an outside environment. For example, garage door or other door seals prevent outside elements (e.g., air, water, etc.) from entering the garage or other interior area enclosed by the door when the door is in a closed position. Door seals also prevent air from entering or leaving the garage or other interior space enclosed by the door when the door is in the closed position, which helps maintain a desired temperature within the garage or other interior space and saves energy on any heating or air conditioning of the garage or other interior space.

Typical seals for a door, such as a garage door, include a flexible portion that contacts the ground or other surface located below the door. The flexible portion deforms when in contact with the ground or other surface located below the door to create a seal against the surface. This deformation of the flexible portion also allows the flexible surface to accommodate some irregularities in the ground or other surface and maintain a better seal between the garage or other interior space and the outside elements.

SUMMARY

An exemplary embodiment of a door seal for attaching to a door includes an elongated body that has a first arm or member for attaching to the door and a second arm or member pivotably coupled to the first arm. In the exemplary embodiment, the first arm has a first connection feature, and the second arm has a second connection feature that is configured to connect to the first connection feature of the first arm. In the exemplary embodiment, the first arm and second arm are movable relative to one another to allow the second arm to be moved to a folded configuration that allows the door seal to be folded into a folded configuration or rolled into a coiled configuration. In the exemplary embodiment, the first arm and second arm are movable relative to one another to allow the second connection feature to connect to the first connection feature such that the door seal can be configured in an installed configuration for installing onto a door or other surface.

Another exemplary embodiment of a door seal for attaching to a door includes an elongated body that has a first arm or member for attaching to the door and a second arm or member pivotably coupled to the first arm. In the exemplary embodiment, the first arm has a first connection feature, and the second arm has a second connection feature that is configured to connect to the first connection feature of the first arm. In the exemplary embodiment, the first arm and second arm are movable relative to one another to allow the second connection feature to connect to the first connection feature such that the door seal can be configured in an installed configuration for installing onto a door or other surface.

Another exemplary embodiment of a door seal for attaching to a door includes an elongated body that has a first arm or member for attaching to the door and a second arm or member. A first end of the second arm is pivotably coupled to a first end of the first arm. The first arm and second arm are movable relative to one another to allow the second arm to be moved to a folded configuration that allows the door seal to be folded into a folded configuration or rolled into a coiled configuration. The second arm is movable relative to the first arm to allow a second end of the second arm to be connected to a second end of the first arm such that the door seal is in an installed configuration.

An exemplary method of packaging a door seal includes providing a single-piece door seal, where the door seal has a first arm for attaching to a door and a second arm pivotably coupled to the first arm. The method further includes positioning the first arm of the door seal relative to the second arm such that the door seal is in a folded configuration, and coiling the door seal when the door seal is in the folded configuration such that the door seal is in a coiled configuration.

An exemplary method of installing a door seal to a door includes connecting a first arm of the door seal to the door. The method further includes connecting a connection feature of a second arm of the door seal to a connection feature of the first arm such that the door seal is moved from a normal configuration to an installed configuration. The second arm of the door seal can be flexible such that the second arm takes a desired shape relative to the first arm. The flexibility of the second arm allows the second arm to create a seal against a ground surface or other surface. The door seal can be moved from the normal configuration to the installed configuration prior to or after the first arm being connected to the door.

DETAILED DESCRIPTION

The Detailed Description describes exemplary embodiments of the invention and is not intended to limit the scope of the claims in any way. Indeed, the invention is broader than and unlimited by the exemplary embodiments, and the terms used in the claims have their full ordinary meaning. Features and components of one exemplary embodiment may be incorporated into the other exemplary embodiments. Inventions within the scope of this application may include additional features, or may have less features, than those shown in, and described in connection with, the exemplary embodiments.

As described herein, the terms "substantially" and "about" are defined as at least close to (and includes) a given value or state (preferably within 10% of, more preferably within 1% of, and most preferably within 0.1% of a given value or state).

Door seals, such as door seals for garage doors, are typically formed from multiple components, in which some of the components are rigid or semi-rigid and some are flexible. As the door seals must extend across substantially the entire length of the door to sufficiently seal an interior area from the exterior elements (e.g., air, water, etc.), door seals can be formed in a vast array of different lengths, including door seals of substantially long lengths. The length of the door seals and the combination of multiple components can create complexities or problems with storage, packaging, and transportation due the length and/or size of the components and the inability to easily manipulate, such as by folding or coiling, the more rigid components.

Some of the exemplary door seals described herein are single piece devices that are configured to be coilable to take up less room during transportation and storage. In alternative embodiments, the door seals could also be folded or otherwise re-configured or manipulated instead of coiled to preserve space. Some of the exemplary door seals described herein are also configured to be uncoiled to a flat configuration for easy installation. In exemplary embodiments, the door seals include a rigid or semi-rigid arm that is configured to attach to a door or other surface and a more flexible arm that is configured to flex and connect to the semi-rigid arm such that the flexible arm takes a desired shape. The flexible arm engages a ground surface to create a seal with the ground surface that prevents outside elements from entering a protected area (e.g., a garage). The embodiments discussed herein describe door seals for use with a garage door. However, the door seals of the present application can be used for any type of door, window, or other opening or combination thereof that requires sealing.

Figure 1:
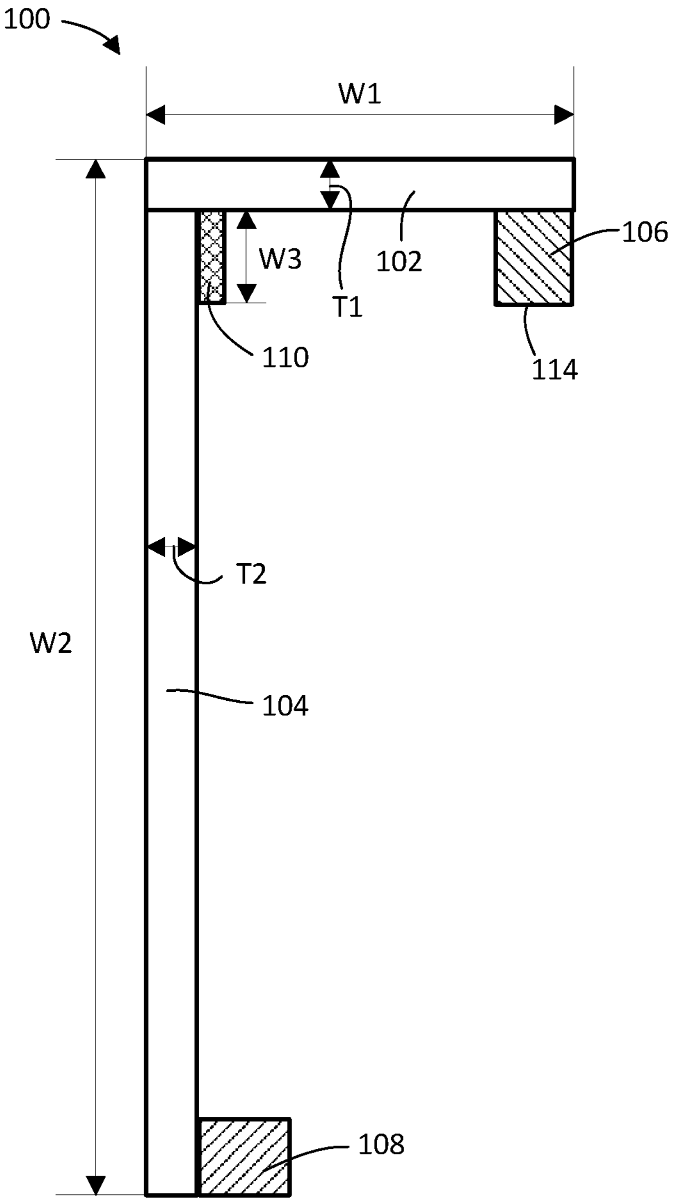
FIG. 1 is a schematic view of an exemplary embodiment of a door seal.
Figure 2:
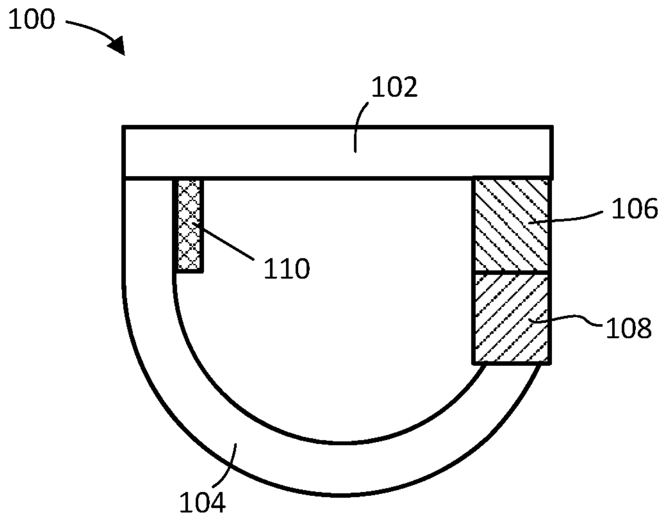
FIG. 2 is a schematic view of the exemplary door seal of FIG. 1 in an installed configuration.
Figure 3:
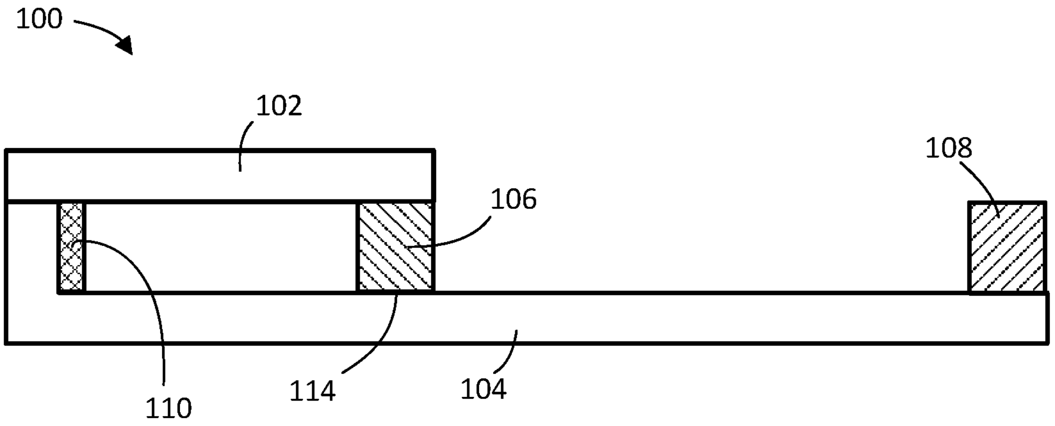
FIG. 3 is a schematic view of the exemplary door seal of FIG. 1 in a folded configuration.

FIGS. 1 through 4 illustrate an exemplary embodiment of a door seal 100 for attaching to a door (e.g., a garage door). The door seal 100 includes an elongated body (that extends into the page in FIGS. 1-4) that has a first arm or member 102 and a second arm or member 104, where the first arm 102 and second arm 104 are pivotable or movable relative to one another to move the second arm 104 between a normal configuration (as shown in FIG. 1) and a folded configuration (as shown in FIG. 3). After being placed in the folded configuration, the exemplary embodiment of the door seal 100 can be rolled to a coiled configuration (e.g., similar to the coiled configuration for the door seal 200 shown in FIG. 11), which is advantageous for packaging and transportation of the door seal 100. When the door seal 100 is ready to be attached to a door, the door seal 100 can be rolled out of the coiled configuration, and then moved from the folded configuration (as shown in FIG. 3) to the normal configuration (as shown in FIG. 1). It should be understood that additional exemplary embodiments of the door seal may not be coilable, but rather be foldable or otherwise reconfigurable or manipulated instead of coiled to preserve space. For example, when the door seal is in the folded configuration (as shown in FIG. 3), the door seal could then be folded onto itself in successive lengths in an accordion fold configuration.

Figure 4:
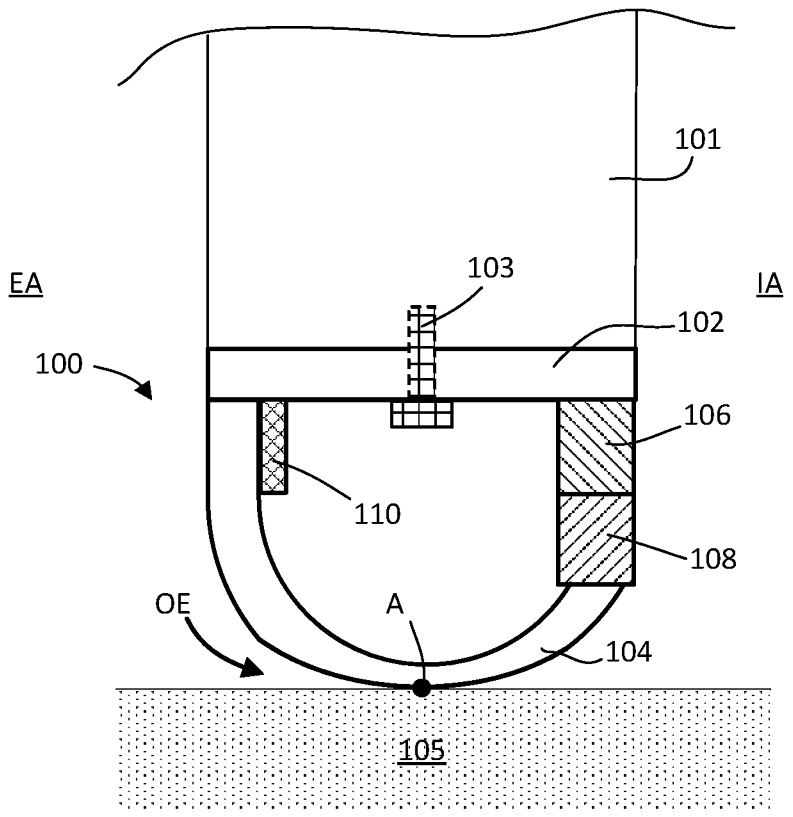
FIG. 4 is a schematic view of the exemplary door seal of FIG. 1 attached to a door, wherein the door seal in an installed configuration and engaging a ground surface.

The first arm 102 of the exemplary embodiment has a first connection feature 106, and the second arm 104 has a second connection feature 108 that is configured to be connected to the first connection feature 106 such that the first and second arms 102, 104 can be connected to cause the door seal 100 to be reconfigured into an installed configuration (as shown in FIGS. 2 and 4). The first and second connection features 106, 108 can take any suitable form that allows the first and second arms 102, 104 to be connected to each other in the installed configuration. For example, the first connection feature 106 can include a female connection component, and the second connection feature 108 can include a male connection component, or vice versa. The first and second connection features 106, 108 can be connected by a snap-fit connection, a friction-fit connection, a tongue and groove connection, an adhesive connection, one or more clips, magnets, hooks, straps, cam-locks, tabs, or other fasteners or connectors, or any other suitable type of connection. While the illustrated embodiment shows each arm 102, 104 having a connection feature 106, 108, in alternative embodiments, only one of the arms 102, 104 may have a connection feature that attaches the arms 102, 104 together, or the arms 102, 104 may be attached together by a separate connection element (e.g., an adhesive, a fastener, etc.).

The first arm 102 of the exemplary embodiment is made from a semi-rigid material that is rigid enough to maintain its shape when in the installed configuration (as shown in FIGS. 2 and 4), but flexible enough to be rolled to the coiled configuration. That is, referring to FIG. 4, the first arm 102 is configured to be connected to a door 101 or other surface (e.g., by a fastener 103) and serve as a foundation for maintaining a desired shape of the second arm 104 when in the installed configuration, which requires the first arm 102 to be rigid enough to substantially maintain its shape when the door seal 100 is moved from the normal configuration to the installed configuration. It should be understood that the exemplary embodiment of the first arm 102 of the door seal 100 could be connected to a door or other surface using any suitable adhesive, fastener or connecting device. The first arm 102 can be made from, for example, polyvinyl chloride (PVC), acrylonitrile butadiene styrene (ABS), acrylonitrile styrene acrylate (ASA), high impact polystyrene (HIPS), or any other suitable material. In certain embodiments, the first arm 102 can be made of a material that has a Shore D hardness of between about 60 and about 100, such as about 80. Referring to FIG. 1, the first arm 102 can have a length (e.g., similar to length L shown in FIG. 5 for the door seal 200) and a width W1 that correlates to the length and width of the door to which it will be attached. For example, the first arm 102 can have a length of between about 2 feet and about 50 feet, such as between about 4 feet and about 50 feet, such as between about 4 feet and about 20 feet. The first arm 102 can have a width W1 of between about %4 inches and about 4 inches. In one exemplary embodiment, the first arm 102 has a width W1 of between about 1.275 inches and about 1.375 inches, such as about 1.305 inches. In another exemplary embodiment, the first arm 102 has a width W1 of between about 1.9 inches and about 2 inches, such as about 1.93 inches. The first arm 102 can have a thickness T1 between about 0.02 and 0.10 inches, such as about 0.06 inches or about 0.055 inches.

The second arm 104 of the exemplary embodiment is made from a material that is more flexible than the first arm 102 such that the second arm 104 is flexible enough to be moved from the normal position (as shown in FIG. 1) to the installed configuration (as shown in FIGS. 2 and 4). That is, the second arm 104 is made from a material that allows the second arm 104 to have a desired shape when connected to the first arm 102 in the installed configuration. Referring to FIG. 4, in the illustrated exemplary embodiment, the second arm 104 has a generally semi-circular or otherwise curved shape relative to the generally flat first arm 102 when in the installed configuration. The second arm 104 can, however, take any other suitable shape, such as, for example, a rectangular shape, a triangular shape, etc. The second arm 104 can be made from, for example, flexible polyvinyl chloride (FPVC), thermoplastic vulcanizates (TPV), thermoplastic polyurethane (TPU), or any other suitable material. In certain embodiments, the second arm 104 can be made of a material that has a Shore A hardness of between about 40 and about 80, such as about 70. Referring to FIG. 1, the second arm 104 can have a length (not shown) that correlates to the length of the door to which it will be attached. For example, the second arm 104 can have a length of between about 2 feet and about 50 feet, such as between about 4 feet and about 50 feet, such as between about 4 feet and about 20 feet. The second arm 104 can have a width W2 of between about 2 inches and about 7 inches. In one exemplary embodiment, the second arm 104 has a width W2 of between about 2.5 inches and about 3.5 inches, such as about 3 inches. In another exemplary embodiment, the second arm 104 has a width W2 of between about 3.5 inches and about 4 inches, such as about 3.77 inches. In certain embodiments, a ratio of the width W2 of the second arm 104 to the width W1 of the first arm 102 is between about 1.25 to 1 and about 4 to 1. The second arm 104 can have a thickness T2 between about 0.02 and 0.06 inches, such as about 0.04 inches or about 0.05 inches. It should be understood that the first arm 102 and second arm 104 could take any suitable shape, size, or dimension and be formed from a variety of different suitable materials or combinations thereof in various embodiments.

Figure 1A:
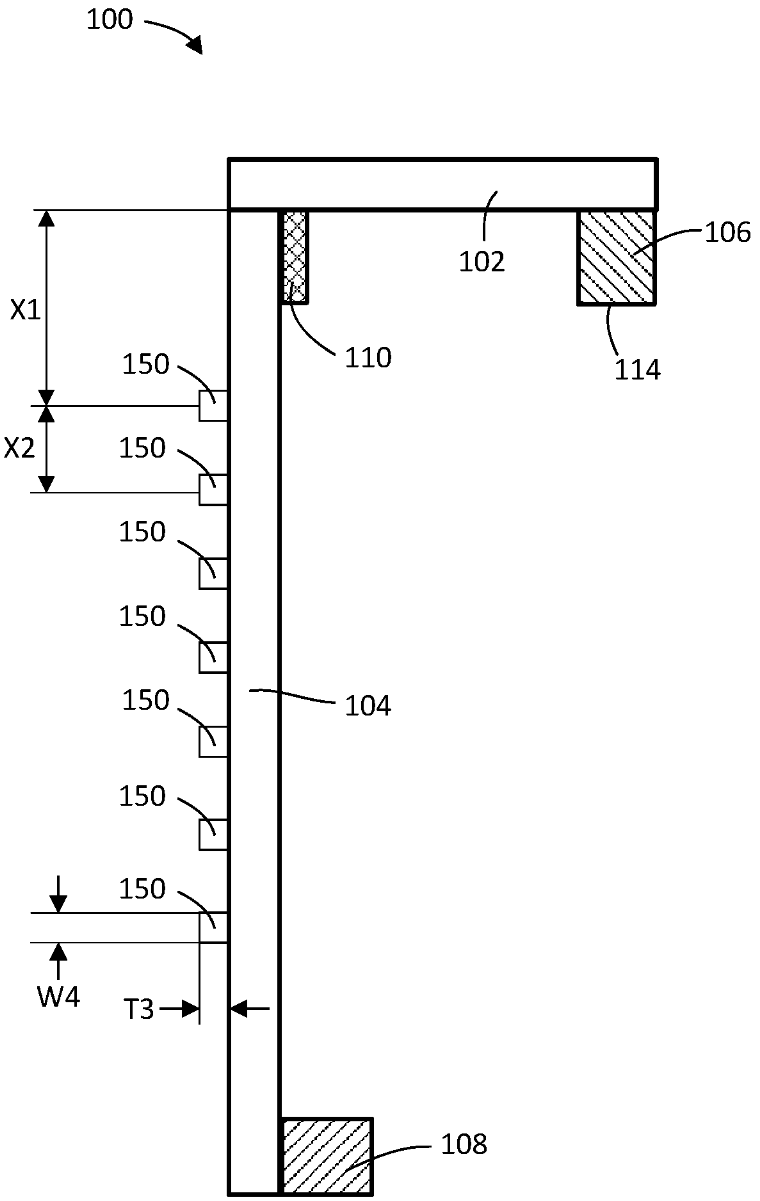
FIG. 1A is a schematic view of the exemplary door seal of FIG. 1, where the door seal includes ribs for engaging a ground surface.

Referring to FIG. 1A, in some instances, the second arm 104 can include one or more ribs 150 for engaging a ground surface or other surface (e.g., the surface 105 shown in FIG. 4). The ribs 150 are configured to prevent the second arm 104 from being frozen together with the ground or other surface in cold weather conditions. That is, the ribs 150 create point contact with the ground or other surface, which prevents an extended surface area of the second arm 104 from engaging the ground or other surface. The point contact between the ribs 150 and the ground or other surface creates breaks in the engagement between the second arm 104 and the ground or other surface, which helps prevent a freezing connection between second arm 104 and the ground or other surface.

The ribs 150 can extend along the length (e.g., similar to length L shown in FIG. 5 for the door seal 200) of the second arm 104. The ribs 150 can extend along an entirety of the length or along any sized portion of the length of the second arm 104. The ribs 150 can be continuous members or discontinuous members. In some instances, each of the ribs 150 can include a plurality of nodules or protuberances that extend along a length of the second arm 104. The ribs 150 can be integral to the second arm 104, or the ribs 150 can be separate components that are affixed to the second arm 104. The ribs 150 can be made from, for example, flexible polyvinyl chloride (FPVC), thermoplastic vulcanizates (TPV), thermoplastic polyurethane (TPU), or any other suitable material.

The ribs 150 can have a thickness T3 of between about 0.01 inches and about 0.05 inches, such as about 0.044 inches. The ribs 150 can have a base width W4 of between about 0.01 inches and about 0.05 inches, such as about 0.044 inches. In the illustrated example, the ribs 150 have a rectangular shape. However, it should be understood that the ribs 150 can have any suitable shape that is configured to create a point connection with a ground or other surface to prevent a freezing connection between the second arm 104 and the ground or other surface. For example, the ribs 150 can have a triangular shape, a polygonal shape, a rounded shape (e.g., circular, elliptical, etc), or any other suitable shape.

In the illustrated example, the second arm 104 includes seven ribs 150. However, it should be understood that the second arm 104 can include any suitable number of ribs 150. For example, the second arm 104 can include one or more ribs, two or more ribs, three or more ribs, four or more ribs, five or more ribs, six or more ribs, seven or more ribs, eight or more ribs, nine or more ribs, ten or more ribs, etc. The rib 150 closest to the first arm 102 can be a distance X1 away from the first arm 102, where the distance X1 is between about 0.4 inches and about 1 inch. The distance X1 can be about 0.527 inches, 0.605 inches, or any other suitable length. In some implementations, the distance X2 between a rib 150 and an adjacent rib 150 can be between about 0.2 inches and about 0.5 inches, such as about 0.3 inches. The distance X2 between adjacent ribs 150 can be uniform for each of the ribs 150, or the distance can vary for each of the ribs 150.

Referring to FIGS. 1 through 4, in some embodiments, the door seal 100 includes a protruding element 110 that extends from first arm 102 for engaging the second arm 104 when the door seal 100 is in both the folded and installed configurations. For example, referring to FIGS. 2 and 4, when the door seal 100 of the exemplary illustrated embodiment is moved to the installed configuration, the second arm 104 pivots relative to the first arm 102 and a portion of the second arm 104 proximate the pivotable connection between the first and second arms 102, 104 engages the protruding element 110 such that the second arm 104 bends and forms a desired shape when the first and second arms 102, 104 are connected together in the installed configuration.

In addition, referring to FIG. 3, when the door seal 100 is moved from the normal configuration to the folded configuration, a portion of the second arm 104 proximate the pivotable connection between the first and second arms 102, 104 bends around the protruding element 110 such that the second arm 104 is substantially parallel to the first arm 102, which allows the door seal 102 to be more easily moved to the folded and coiled configuration. In certain embodiments, the protruding element 110 can serve to support the second arm 104 when the exemplary illustrated embodiment of the door seal is in the folded configuration (as illustrated in FIG. 3) to prevent the second arm 104 or the overall shape of the door seal 100 from being compressed, crushed, or deformed when the door seal 100 is in the folded configuration. In certain embodiments, the protruding element 110 includes a curved portion (not shown) that facilitates bending of the second arm 104 around the protruding element 110 and into a substantially parallel position relative to the first arm 102. The protruding element 110 can have a width W3 of between about 0.1 inches and about 0.5 inches, such as between about 0.2 inches and about 0.4 inches, such as about 0.3 inches. In certain embodiments, the width W3 of the protruding element 110 aligns with a surface 114 of the connection feature 106 of the first arm 102, which causes a two-point contact when the door seal 100 is in the installed configuration and the door is closed on the door seal 100, as well as facilitates movement of the door seal 100 to the folded configuration and the coiled configuration.

The door seal 100 can include a single protruding element 110 that extends substantially along the length of the elongated body of the door seal 100, or the door seal 100 can include a plurality of protruding elements 110 that collectively extends along the length, or a portion of the length, of the elongated body of the door seal 100. In one exemplary embodiment, a single protruding element 110 extends along an entire length of one or both of the first and second arms 102, 104. It should be understood that the protruding element 110 could take any suitable shape, size, or dimension and be formed from a variety of different suitable materials or combinations thereof in various embodiments. In various embodiments, no protruding element 110 is included.

During installation of the door seal 100 to a door 101 or other surface, the first arm 102 is connected to the door (e.g., by one or more of the fasteners 103 shown in FIG. 4) when the door seal 100 is in the normal configuration (as shown in FIG. 1). Referring to FIG. 4, after the first arm 102 is secured to the door 101, the connection feature 108 of the second arm 104 is connected to the connection feature 106 of the first arm 102 (or the ends of the first and second arms 102, 104 or otherwise connected) such that the door seal 100 is in the installed configuration. In various additional embodiments, the door seal may be configured into the installed configuration prior to being connected to a door or other surface. When in the installed configuration and connected to the door 100 such that the door seal 100 is engaging the ground or other surface 105, the second arm 104 is configured to create a seal (e.g., at point A) with the surface 105 such that outside elements OE are prevented from moving from an exterior area EA to an interior area IA that is protected by the door 101 and door seal 100. The flexibility of the second arm 104 of the door seal 100 allows the second arm 104 to compress against the ground surface 105 and create the seal necessary to prevent the outside elements OE from moving into the interior area IA. It should be understood that while the door seal 100 is described in use for sealing an exterior door, the door seal could also be used in connection with interior doors or for scaling windows or other openings.

Figure 5:
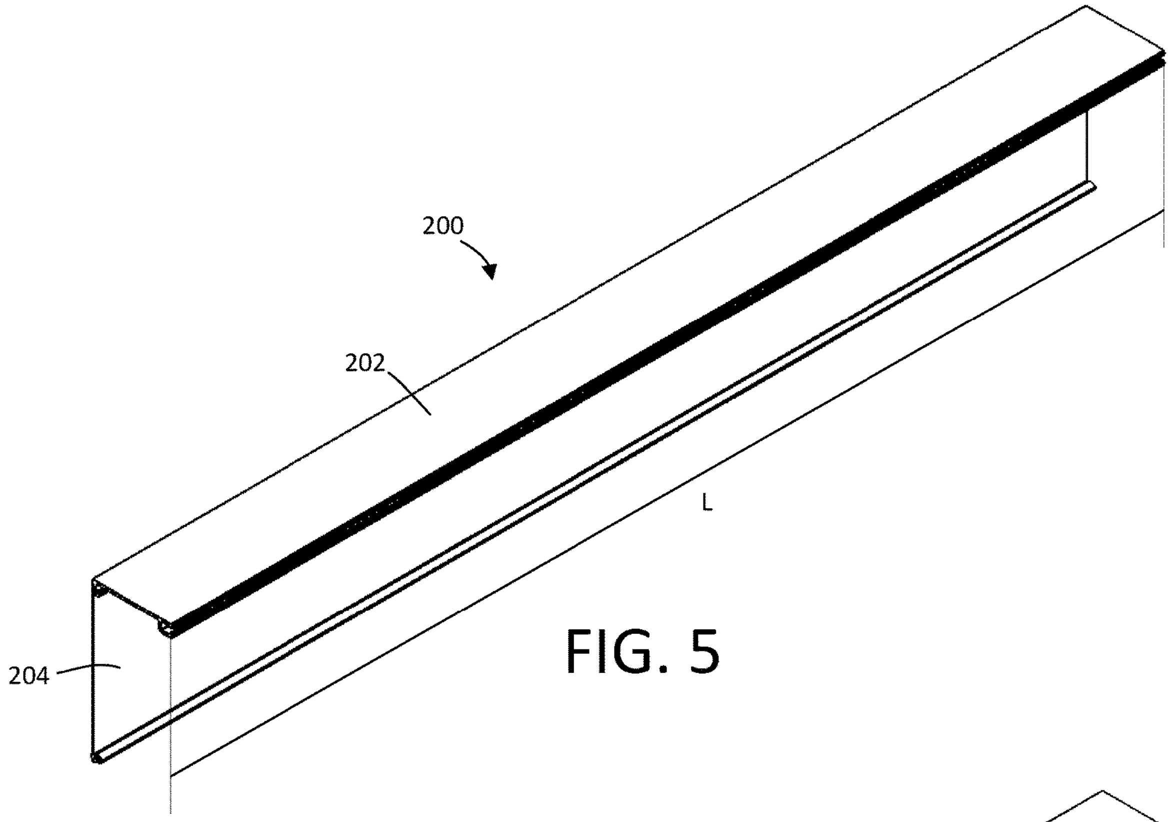
FIG. 5 is a perspective view of another exemplary embodiment of a door seal.
Figure 6:
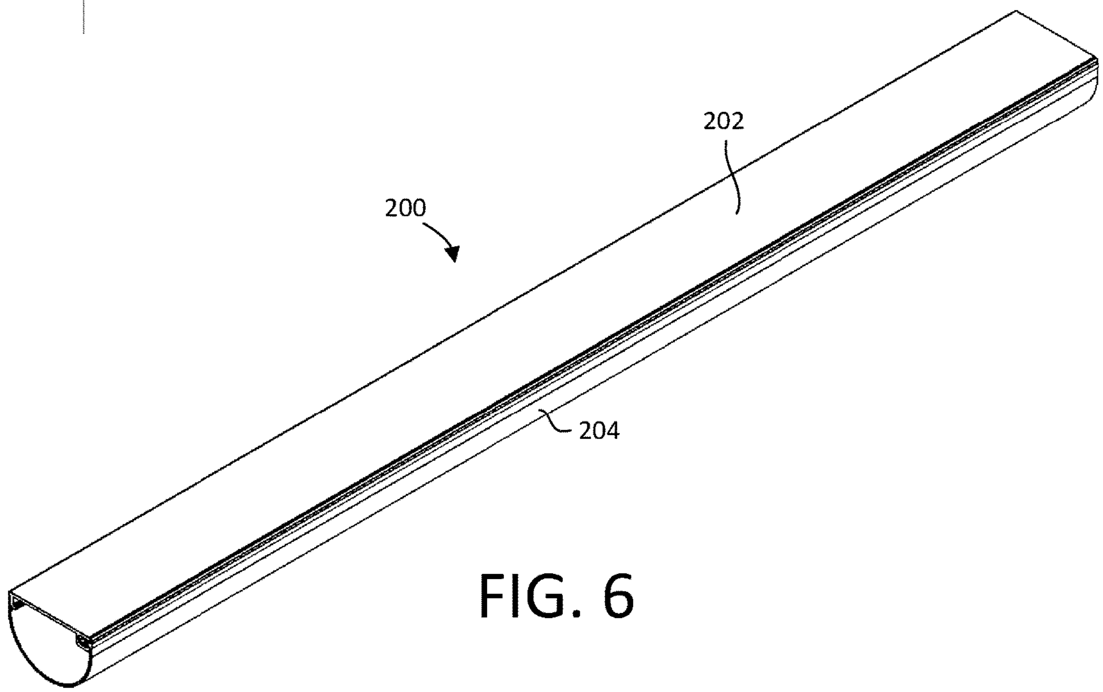
FIG. 6 is a perspective view of the exemplary door seal of FIG. 5 in an installed configuration.
Figure 8:
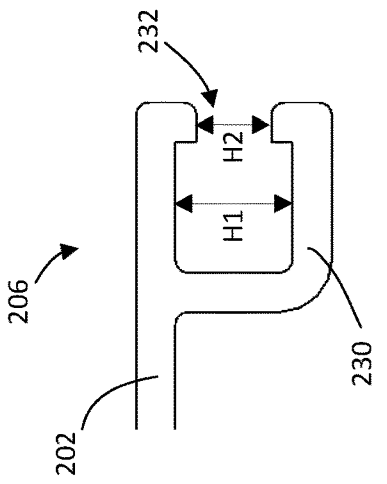
FIG. 8 is a front view of an exemplary embodiment of a connection feature for the exemplary door seal of FIG. 5.
Figure 9:
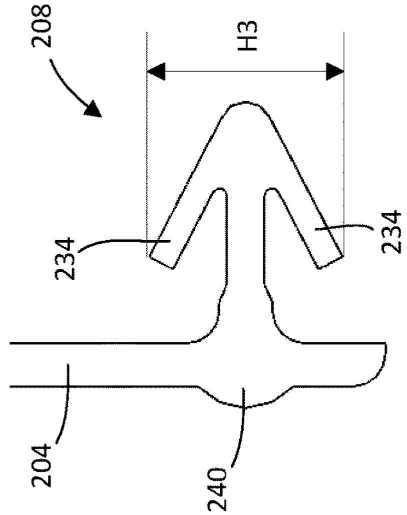
FIG. 9 is a front view of an exemplary embodiment of another connection feature for the exemplary door seal of FIG. 5.
Figure 7:
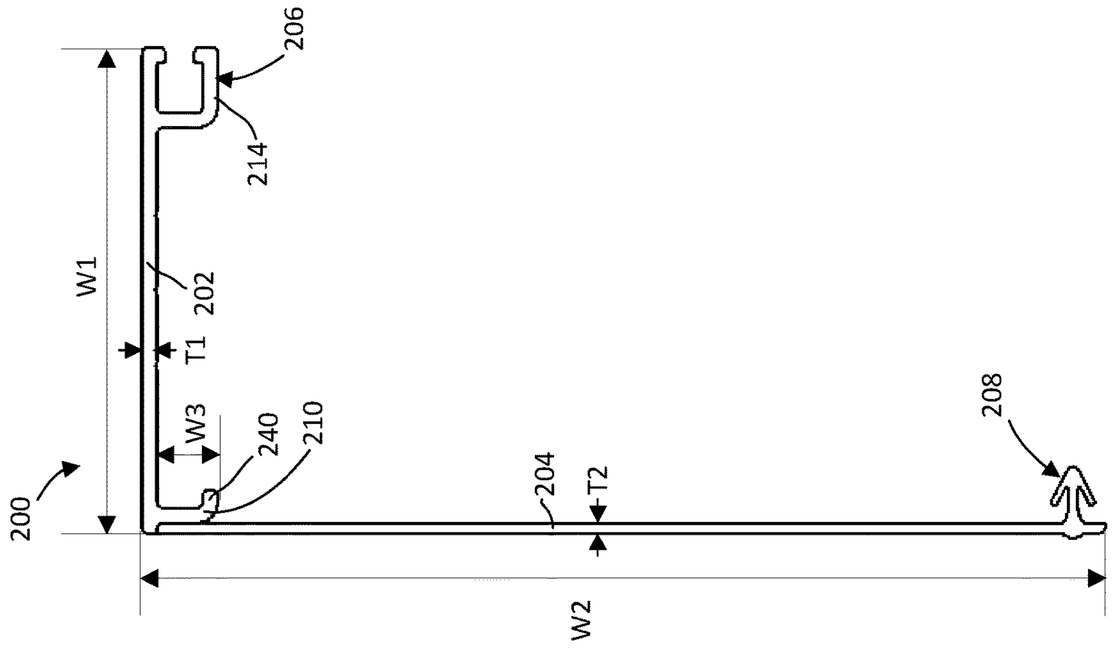
FIG. 7 is a front view of the exemplary door seal of FIG. 5.
Figure 11:
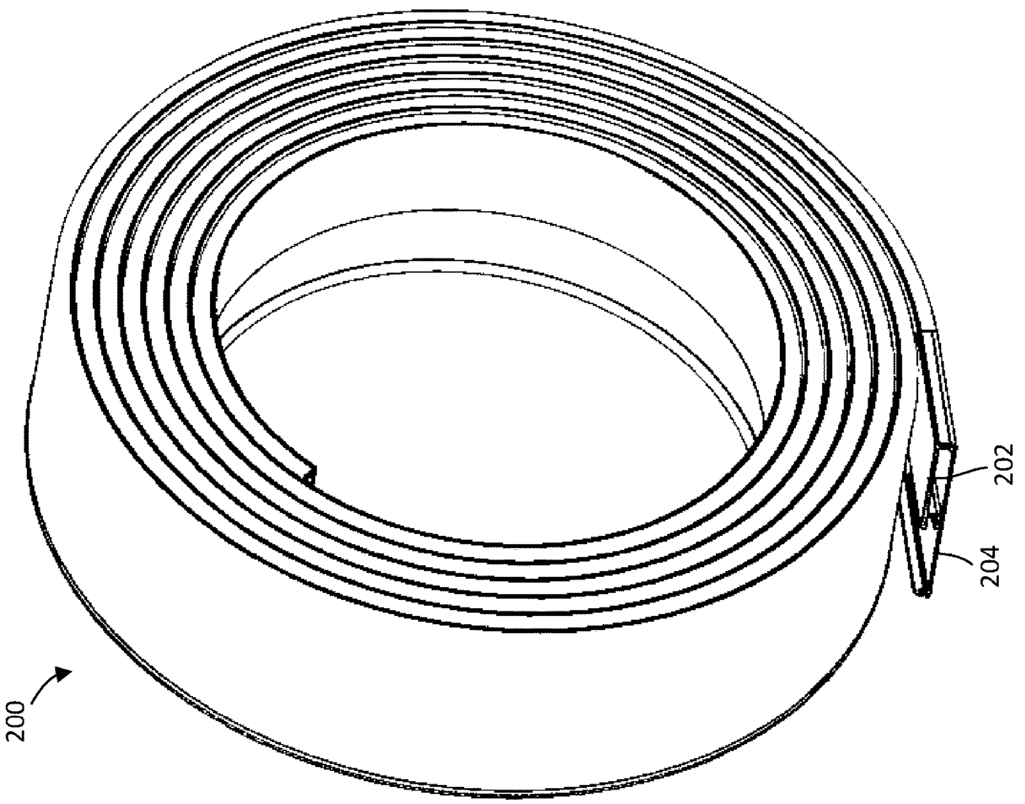
FIG. 11 is a perspective view of the exemplary door seal of FIG. 5 in a folded and coiled configuration.
Figure 10:
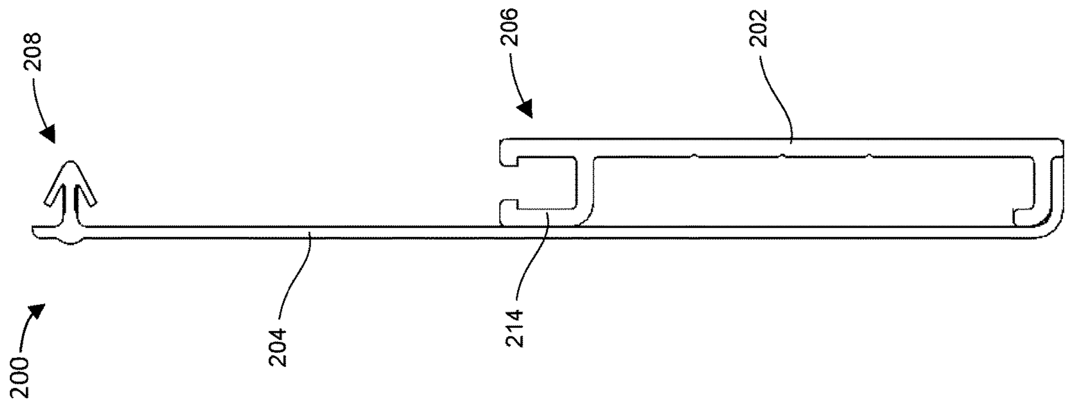
FIG. 10 is a front view of the exemplary door seal of FIG. 5 in a folded configuration.

FIGS. 5 through 15 illustrate an exemplary embodiment of a door seal 200 for attaching to a door (e.g., a garage door). The door seal 200 includes an elongated body that has a first arm or member 202 and a second arm or member 204, where the first arm 202 is pivotable relative to the second arm 204 between a normal configuration (as shown in FIG. 7) and a folded configuration (as shown in FIG. 10). After being placed in the folded configuration, the door seal 200 can be rolled to a coiled configuration (as shown in FIG. 11), which is advantageous for packaging and transportation of the door seal 200. When the door seal 200 is ready to be attached to a door, the door seal 200 can be rolled out of the coiled configuration and moved to the normal configuration (as shown in FIG. 5). Referring to FIG. 5, the elongated body of the door seal 200 has a length L that can be between about 2 feet and about 50 feet, such as between about 4 feet and about 50 feet, such as between about 4 feet and about 20 feet.

Figure 15:
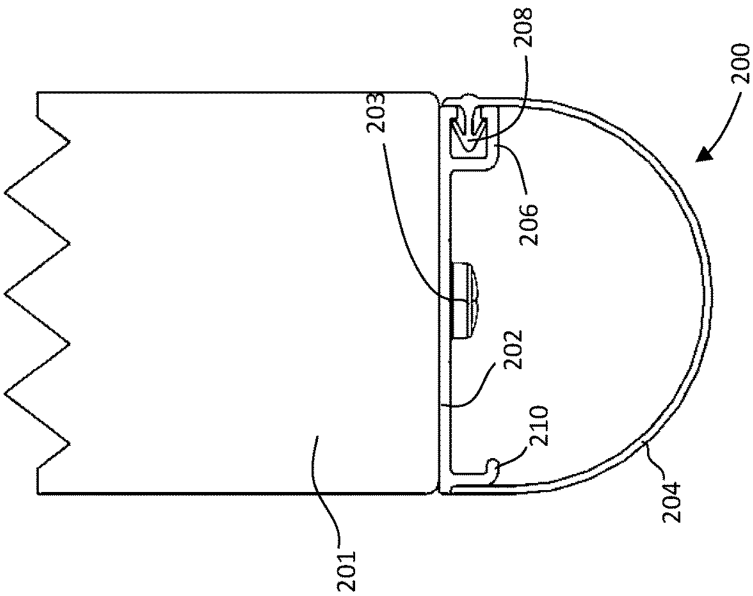
FIG. 15 is a front view of the exemplary door seal of FIG. 5 attached to a door, where the door seal is in the installed configuration.
Figure 14:
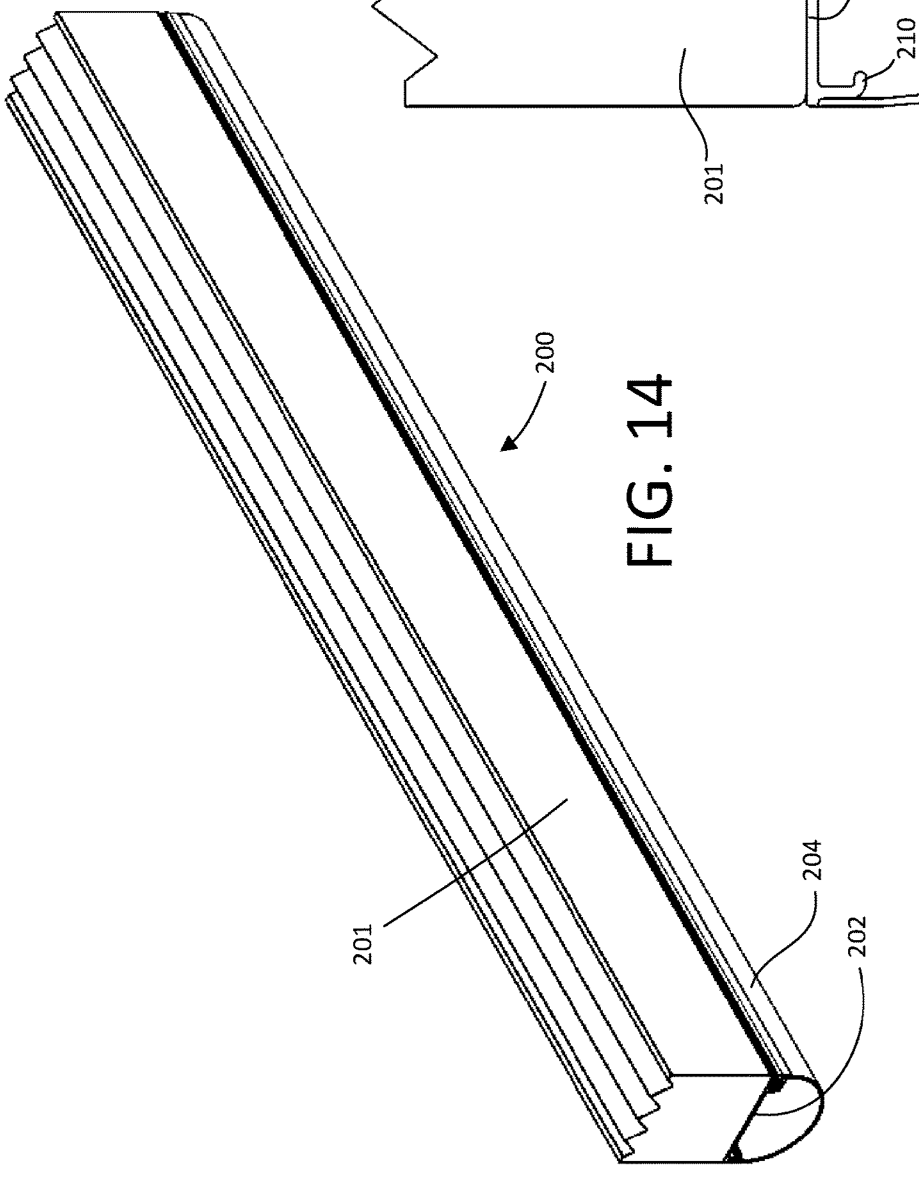
FIG. 14 is a perspective view of the exemplary door seal of FIG. 5 attached to a door, where the door seal is in the installed configuration.

In the illustrated exemplary embodiment, the first arm 202 has a first connection feature 206, and the second arm 204 has a second connection feature 208 that is configured to be connected to the first connection feature 206 such that the first and second arms 202, 204 can be connected to cause the door seal 200 to be in an installed configuration (as shown in FIGS. 6 and 14-15). Referring to FIG. 8, in the illustrated embodiment, the first connection feature 206 is a female connection component that includes a receptacle 230 having an opening 232, where a width H1 of the interior of the receptacle 230 is larger than a width H2 of the opening 232. The width H1 can be, for example, between about 0.15 inches and about 0.25 inches, such as about 0.18 inches. The width H2 can be, for example, between about 0.075 inches and about 0.15 inches, such as about 0.115 inches.

Referring to FIG. 9, in the illustrated embodiment, the second connection feature 208 is a male connection component that includes flexible arms 234 that are configured to compress when moving through the opening 232 of the first connection feature 206 and expand to their normal position in the receptacle 230 of the first connection feature 206. That is, the second connection feature 208 can have a width H3 when in the normal position that is larger than the width H2 of the opening 232 such that the second connection feature maintains a connection with the first connection feature 206 when the flexible arms 234 are in the normal position and disposed within the receptacle 230. The width H3 can be, for example, between about 0.15 inches and about 0.25 inches, such as about 0.18 inches. In certain embodiments the width H3 of the second connection feature 208 is substantially equal to the width H1 of the receptacle 230. In an alternative embodiment, the first connection feature 206 can take the form of the male connection component, and the second connection feature 208 can take the form of the female connection component.

Still referring to FIG. 9, in some embodiments, the second arm 204 can include a protruding portion 240 that helps facilitate connection of the second connection feature 208 to the first connection feature 206. For example, the protruding portion 240 can allow a user to use a tool (e.g., a spline tool) to connect the second connection feature 208 to the first connection feature 206. In the illustrated embodiment, the protruding portion 240 has a rounded shape. However, it should be understood that the protruding portion 240 can take any other suitable shape that allows a user to use a tool to facilitate connection between the second connection feature 208 and the first connection feature 206. Alternatively, a user can manually connect the second connection feature 208 to the first connection feature 206.

While the illustrated embodiment shows the second connection feature 208 as having a pair of flexible arms 234, it should be understood that the second connection feature 208 can have any suitable number of flexible arms 208 that are capable of moving to a compressed configuration to move through the opening 232 of the first connection feature 206 and expanding after being disposed within the receptacle 230 of the first connection feature 206. In alternative embodiments, the second connection feature 208 may not include flexible arms, but can take any other suitable form that is capable of compressing and moving through the opening 232 of the first connection feature 206 and expanding after being disposed within the receptacle 230 of the first connection feature 206 to retain the second connection feature within the receptacle 230. It should be understood that the first connection feature 206 and second connection feature 208 could take any suitable shape, size, or dimension and be formed from a variety of different suitable materials or combinations thereof in various embodiments. The first connection feature 206 and second connection feature 208 could take any shape that allows the first arm 202 and second arm to be connected to one another.

The first arm 202 of the illustrated exemplary embodiment is made from a semi-rigid material that is rigid enough to maintain its shape when in the installed configuration (as shown in FIGS. 6 and 14-15), but flexible enough to be rolled to the coiled configuration (as shown in FIG. 11). That is, referring to FIG. 15, the first arm 202 is configured to be connected to a door 201 or other surface (e.g., by a fastener 203) and serve as a foundation for maintaining a desired shape of the second arm 204 when in the installed configuration, which requires the first arm 202 to be rigid enough to substantially maintain its shape when the door seal 200 is moved from the normal configuration to the installed configuration. The first arm 202 can be made from, for example, polyvinyl chloride (PVC), acrylonitrile butadiene styrene (ABS), acrylonitrile styrene acrylate (ASA), high impact polystyrene (HIPS), or any other suitable material. In certain embodiments, the first arm 202 can be made of a material that has a Shore D hardness of between about 60 and about 100, such as about 80. Referring to FIG. 7, the first arm 202 can have a width W1 that correlates to the width of the door to which it will be attached. For example, the first arm 202 can have a width W1 of between about % inches and about 4 inches. In one exemplary embodiment, the first arm 202 has a width W1 of between about 1.275 inches and about 1.375 inches, such as about 1.305 inches. In another exemplary embodiment, the first arm 202 has a width W1 of between about 1.9 inches and about 2 inches, such as about 1.93 inches. The first arm 202 can have a thickness T1 between about 0.02 and 0.10 inches, such as about 0.06 inches or about 0.055 inches.

The second arm 204 of the illustrated exemplary embodiment is made from a material that is more flexible than the first arm 202 such that the second arm 204 is flexible enough to be moved from the normal position (as shown in FIG. 7) to the installed configuration (as shown in FIG. 15). That is, the second arm 204 is made from a material that allows the second arm 204 to have a desired shape when connected to the when connected to the first arm 202 in the installed configuration. Referring to FIG. 15, in the illustrated embodiment, the second arm 204 has a curved shape when in the installed configuration. The second arm 204 can, however, take any other suitable shape, such as, for example, a rectangular shape, a triangular shape, etc. The second arm 204 104 can be made from, for example, flexible polyvinyl chloride (FPVC), thermoplastic vulcanizates (TPV), thermoplastic polyurethane (TPU), or any other suitable material. In certain embodiments, the second arm 204 can be made of a material that has a Shore A hardness of between about 40 and about 80, such as about 70. Referring to FIG. 7, the second arm 204 can have a width W2 of between about 2 inches and about 7 inches. In one exemplary embodiment, the second arm 204 has a width W2 of between about 2.5 inches and about 3.5 inches, such as about 3 inches. In another exemplary embodiment, the second arm 204 has a width W2 of between about 3.5 inches and about 4 inches, such as about 3.77 inches. In certain embodiments, a ratio of the width W2 of the second arm 204 to the width W1 of the first arm 202 is between about 1.25 to 1 and about 4 to 1. The second arm 204 can have a thickness T1 between about 0.02 and 0.06 inches, such as about 0.04 inches or about 0.05 inches. It should be understood that the first arm 202 and second arm 204 could take any suitable shape, size, or dimension and be formed from a variety of different suitable materials or combinations thereof in various embodiments.

Figure 17:
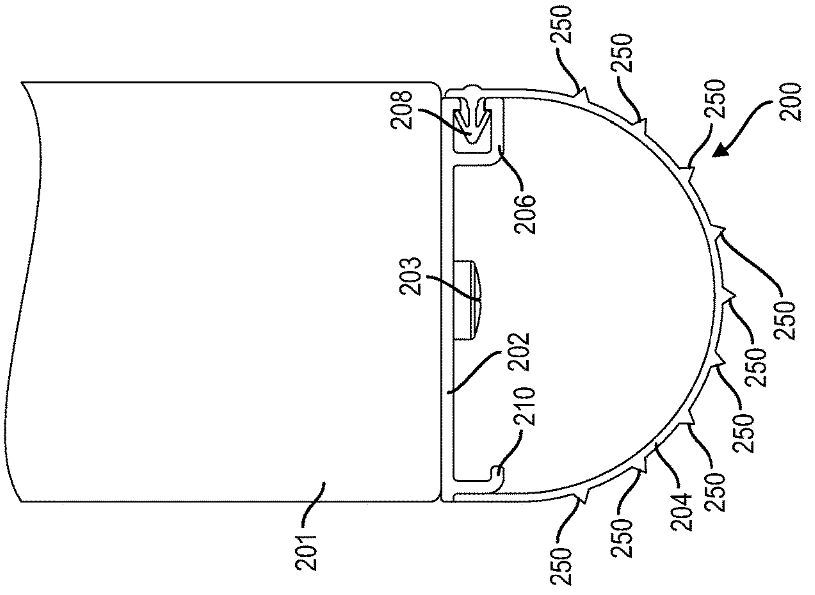
FIG. 17 is a front view of the exemplary door seal of FIG. 16 attached to a door, where the door seal is in the installed configuration.
Figure 16:
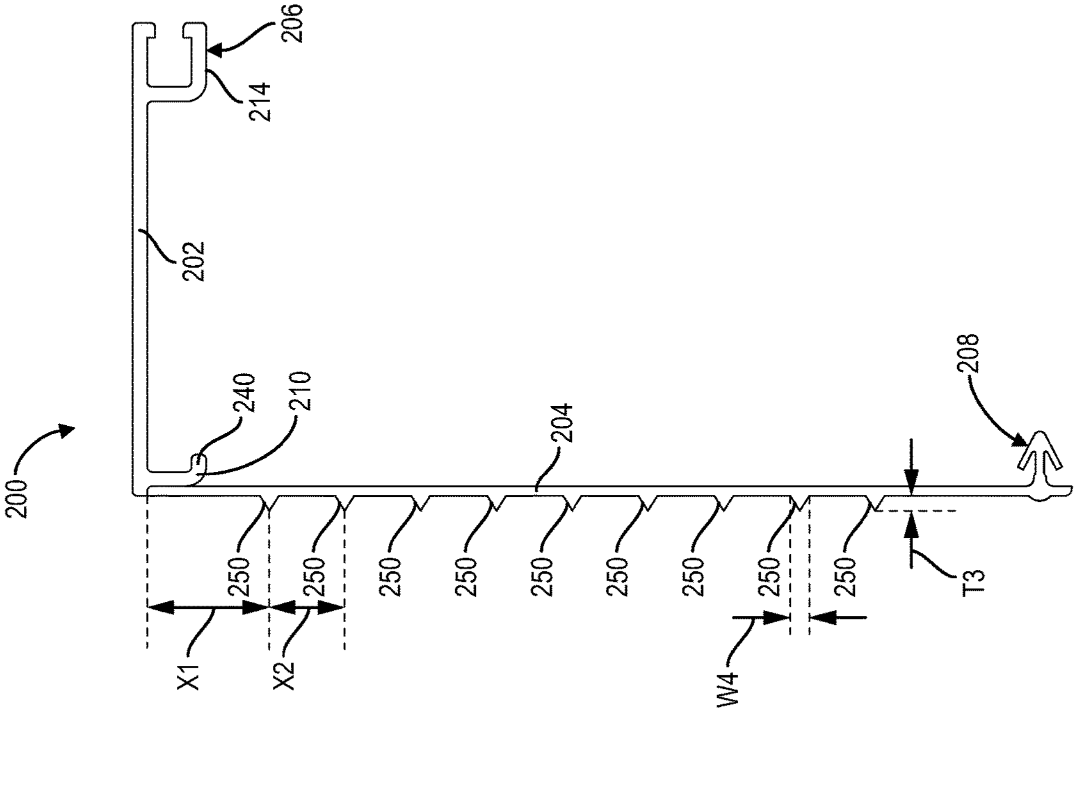
FIG. 16 is a front view of the exemplary door seal of FIG. 5, where the door seal includes ribs for engaging a ground surface.

Referring to FIGS. 16 and 17, in some instances, the second arm 204 can include one or more ribs 250 for engaging a ground surface or other surface (e.g., similar to the surface 105 shown in FIG. 4). The ribs 250 are configured to prevent the second arm 204 from being frozen together with the ground or other surface in cold weather conditions. That is, the ribs 250 create point contact with the ground or other surface, which prevents an extended surface area of the second arm 204 from engaging the ground or other surface. The point contact between the ribs 250 and the ground or other surface creates breaks in the engagement between the second arm 204 and the ground or other surface, which helps prevent a freezing connection between second arm 204 and the ground or other surface.

The ribs 250 can extend along the length (e.g., the length L shown in FIG. 5) of the second arm 204. The ribs 250 can extend along an entirety of the length or along any sized portion of the length of the second arm 204. The ribs 250 can be continuous members or discontinuous members. In some instances, each of the ribs 250 can include a plurality of nodules or protuberances that extend along a length of the second arm 204. The ribs 250 can be integral to the second arm 204, or the ribs 250 can be separate components that are affixed to the second arm 204. The ribs 250 can be made from, for example, flexible polyvinyl chloride (FPVC), thermoplastic vulcanizates (TPV), thermoplastic polyurethane (TPU), or any other suitable material.

The ribs 250 can have a thickness T3 of between about 0.01 inches and about 0.05 inches, such as about 0.044 inches. The ribs 250 can have a base width W4 of between about 0.01 inches and about 0.05 inches, such as about 0.044 inches. In the illustrated example, the ribs 250 have a triangular shape. However, it should be understood that the ribs 250 can have any suitable shape that is configured to create a point connection with a ground or other surface to prevent a freezing connection between the second arm 204 and the ground or other surface. For example, the ribs 250 can have a rectangular shape, a polygonal shape, a rounded shape (e.g., circular, elliptical, etc), or any other suitable shape.

In the illustrated example, the second arm 204 includes nine ribs 150. However, it should be understood that the second arm 204 can include any suitable number of ribs 250. For example, the second arm 204 can include one or more ribs, two or more ribs, three or more ribs, four or more ribs, five or more ribs, six or more ribs, seven or more ribs, eight or more ribs, nine or more ribs, ten or more ribs, etc. The rib 250 closest to the first arm 202 can be a distance X1 away from the first arm 202, where the distance X1 is between about 0.4 inches and about 1 inch. The distance X1 can be about 0.527 inches, 0.605 inches, or any other suitable length. In some implementations, the distance X2 between a rib 250 and an adjacent rib 250 can be between about 0.2 inches and about 0.5 inches, such as about 0.3 inches. The distance X2 between adjacent ribs 250 can be uniform for each of the ribs 150, or the distance can vary for each of the ribs 250.

In some embodiments, the door seal 200 includes a protruding element 210 that extends from first arm 202 for engaging the second arm 204 when the door seal 200 is in both the folded and installed configurations. For example, referring to FIG. 15, when the door seal 100 is moved to the installed configuration, the second arm 204 pivots relative to the first arm 202 and a portion of the second arm 204 proximate the pivotable connection between the first and second arms 202, 204 engages the protruding element 210 such that the second arm 204 bends and forms a desired shape when the first and second arms 202, 204 are connected together in the installed configuration.

In addition, referring to FIG. 10, when the door seal 200 is moved from the normal configuration to the folded configuration, the portion of the second arm 204 proximate the pivotable connection between the first and second arms 202, 204 bends around the protruding element 210 such that the second arm 204 is substantially parallel to the first arm 202, which allows the door seal 202 to be more easily moved to the folded and coiled configuration (as shown in FIG. 11). In certain embodiments, the protruding element 210 can serve to support the second arm 204 when the exemplary illustrated embodiment of the door seal is in the folded position (as illustrated in FIG. 10) to prevent the second arm 204 or the overall shape of the door seal 200 from being compressed, crushed, or deformed when the door seal 200 is in the folded position. In the illustrated embodiment, the protruding element 210 includes a curved portion 236 that facilitates bending of the second arm 204 around the protruding element 210 and into a substantially parallel position relative to the first arm 202. Referring to FIG. 7, the protruding element 210 can have a width W3 of between about 0.1 inches and about 0.5 inches, such as between about 0.2 inches and about 0.4 inches, such as about 0.3 inches. In the illustrated embodiment, the width W3 of the protruding element 210 aligns with the end 214 of the connection feature 206 of the first arm 202, which causes a two-point contact when the door seal 100 is in the installed configuration and the door is closed on the door seal 100, as well as facilitates movement of the door seal 100 to the folded configuration and the coiled configuration.

The door seal 200 can include a single protruding element 210 that extends substantially along the length, or a portion of the length, of the elongated body of the door seal 200, or the door seal 200 can include a plurality of protruding elements 210 that collectively extends along the length, or a portion of the length, of the elongated body of the door seal 200. It should be understood that the protruding element 210 could take any suitable shape, size, or dimension and be formed from a variety of different suitable materials or combinations thereof in various embodiments. In various embodiments, no protruding element 210 is included.

Figure 13:
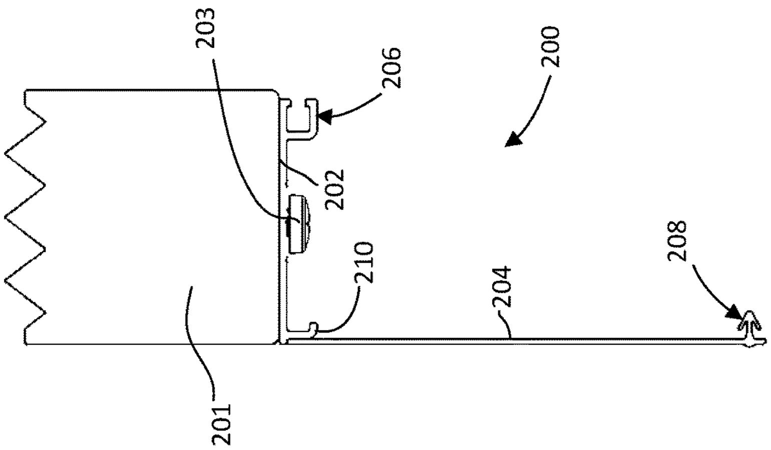
FIG. 13 is a front view of the exemplary door seal of FIG. 5 attached to a door.
Figure 12:
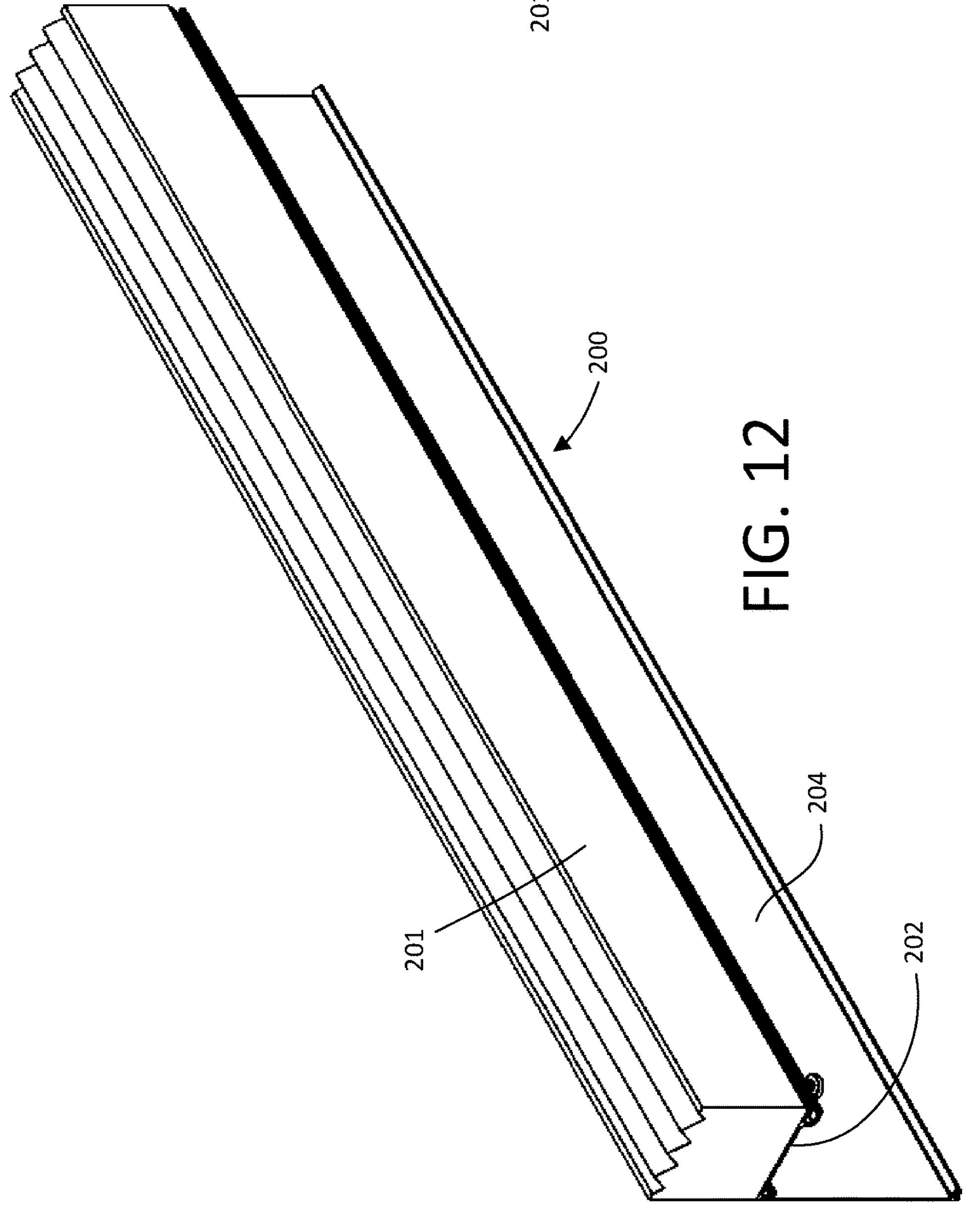
FIG. 12 is a perspective view of the exemplary door seal of FIG. 5 attached to a door.

During installation of the door seal 200 to the door 201, the first arm 202 is connected to the door or other surface (e.g., by one or more of the fasteners 203 shown in FIG. 4) when the door seal 200 is in the normal configuration (as shown in FIGS. 12 and 13). After the first arm 202 is secured to the door 201 or other surface, the connection feature 208 of the second arm 204 is connected to the connection feature 206 of the first arm 202 such that the door seal 200 is in the installed configuration (as shown in FIGS. 14 and 15). In various additional embodiments, the door seal may be configured into the installed configuration prior to being connected to a door or other surface. When in the installed configuration and connected to the door 200 such that the door seal 200 is engaging the ground or other surface (not shown), the second arm 204 is configured to create a seal with the surface such that outside elements are prevented from moving from an exterior area to an interior area that is protected by the door 201 and door seal 200. The flexibility of the second arm 204 of the door seal 200 allows the second arm 204 to compress against the ground or other surface and create the seal necessary to prevent the outside elements from moving into the interior area. It should be understood that while the door seal 200 is described in use for sealing an exterior door, the door seal could also be used in connection with interior doors or for scaling windows or other openings.

While various inventive aspects, concepts and features of the inventions may be described and illustrated herein as embodied in combination with exemplary embodiments, these various aspects, concepts and features may be used in many alternative embodiments, either individually or in various combinations and sub-combinations thereof. For example, in various embodiments the door seal may include a first arm or member for attaching to the door and a second arm that is movable relative to the first arm to allow the second arm to be connected to the first arm such that the door seal can be configured into an installed configuration (e.g., as illustrated in FIG. 2, 4, 6, 14 or 15, but not be configured for being folded into a folded configuration that permits the door seal to be coilable. Unless expressly excluded herein, all such combinations and sub-combinations are intended to be within the scope of the present inventions. Still further, while various alternative embodiments as to the various aspects, concepts and features of the inventions-such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein.

Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

The invention claimed is:

1. A method of packaging a single-piece door seal, the method comprising:

providing the single-piece door seal, the single-piece door seal comprising:

an elongated body that can be coiled into a coiled condition from an uncoiled condition;

a first arm for directly attaching the elongated body to a door or other surface when the elongated body is in the uncoiled condition;

a protruding element of the first arm extending from the first arm a first distance;

a first connection feature of the first arm: and a second arm pivotably coupled to the first arm, wherein the second arm has a second connection feature for removably connecting to the first connection feature of the first arm;

positioning the first arm of the door seal relative to the second arm such that the door seal is in a folded configuration;

coiling the door seal when the door seal is in the folded configuration such that the door seal is in a coiled configuration; and placing the door seal in a packaging material when the door seal is in the coiled configuration.

2. The method according to claim 1, wherein the protruding element that extends from the first arm engages the second arm when the door seal is in the folded configuration.

3. The method according to claim 1, wherein the first arm is substantially parallel to the second arm when the door seal is in the folded configuration.

4. The method according to claim 1, wherein the first arm has a hardness that is greater than a hardness of the second arm.

5. The method according to claim 1, wherein the first arm comprises PVC and the second arm comprises FPVC.

6. The method according to claim 1, wherein the first arm has a Shore D hardness of between 60 and 100.

7. The method according to claim 1, wherein the second arm has a Shore A hardness of between 40 and 80.

8. The method according to claim 1, wherein the second arm comprises one or more ribs that are configured to engage a ground surface when the door seal is in an installed condition.

9. The method according to claim 1, wherein the protruding element of the first arm engages the second arm when the door seal is in an installed configuration to cause the second arm to have a desired shape.

10. The method according to claim 1, wherein the first connection feature comprises a female connection component, and wherein the second connection feature comprises a male connection component.

11. The method according to claim 10, wherein the second connection feature is configured to connect to the first connection feature to connect the second arm to the first arm such to place the door seal in an installed condition.

12. The method according to claim 1, wherein the second connection feature is configured to connect to the first connection feature to connect the second arm to the first arm such to place the door seal in an installed condition.

13. The method according to claim 1, wherein the first connection feature extends from the first arm the first distance.

14. The method according to claim 1, wherein the second connection feature is configured to connect to the first connection feature to connect the second arm to the first arm such to place the door seal in an installed condition.

15. A method of packaging a single-piece door seal, the method comprising:

providing an elongated body configured to be rolled into a storage condition from a flat condition, wherein the elongated body comprises:

a first arm for directly attaching the elongated body to a door or other surface when the elongated body is in the uncoiled condition, wherein the first arm has a first end and a second end;

a protruding element of the first arm extending from the first arm a first distance;

a first connection feature of the first arm, wherein the first connection feature is disposed at the second end of the first arm; and a second arm that has a first end and a second end, wherein the first end of the second arm is pivotably coupled to the first end of the first arm, and wherein the second arm has a second connection feature that is disposed at the second end of the second arm and is for removably connecting to the first connection feature of the first arm;

folding the first arm relative to the second arm to place the elongated body in a folded condition;

manipulating the door seal into the storage condition so that the second arm is on an outer surface of the door seal; and inserting the door seal in the storage condition into a package.

16. The method of claim 15, wherein the first connection feature extends from the first arm the first distance.

17. The method of claim 15, wherein the step of manipulating the door seal into the storage condition comprises rolling the door seal.

18. The method according to claim 15, wherein the first connection feature comprises a female connection component, and wherein the second connection feature comprises a male connection component.

* * * * *